Aug. 22, 1939.　　　　J. P. JOHNSON　　　　2,170,530

FUEL PUMP

Filed Oct. 25, 1937

INVENTOR.
JAMES P. JOHNSON
BY
ATTORNEY.

Patented Aug. 22, 1939

2,170,530

UNITED STATES PATENT OFFICE 2,170,530

FUEL PUMP

James P. Johnson, Shaker Heights, Ohio, assignor, by mesne assignments, to Pump Engineering Service Corporation, Cleveland, Ohio, a corporation of Ohio Application October 25, 1937, Serial No. 170,844

14 Claims. (Cl. 103—42)

This invention relates to fuel pumps for use on aircraft, and of the type generally disclosed in my copending application, Serial No. 10,644, filed March 12, 1935, and embodies an improvement in the construction and operation thereover. While the fuel pump, disclosed in my copending application, worked successfully and has been installed and efficiently operated on many planes, it was found that the high-grade gasoline used in aircraft vaporlocks or pulls apart at certain altitudes, or when restrictions are in the intake line, or the combination of both, thus introducing air with the gasoline which acts upon the relief valve in such a manner as to cause movements or pulsations of considerable magnitude, so much so that the metal Sylphon crystallized and broke in a comparatively short time.

It is one of the objects of the present invention, therefore, to provide an impervious flexible substantially flat member which is connected to the relief valve and of a material which will not crystallize, thus improving the efficiency of the pump and materially increasing its life.

Another object of the invention is to provide a suitable means connected with the relief valve in such a manner that fuel may be introduced into the pump from an outside source, in the event the pump should become incapacitated, and the pressure of the introduced fuel upon said means such as to cause the relief valve to be opened to by-pass the fuel thereby, so as to discharge the fuel from the outlet opening without any great pressure difference between the introduced fuel and the discharged fuel.

Another object of the invention is to provide a spring loaded relief valve normally maintained in closed position and having a simple and novel means of adjustment, whereby the tension of the spring may be varied to predeterminately preload the relief valve.

With the objects above indicated, and other objects hereinafter explained in view, my invention consists in the construction and combination of elements hereinafter described and claimed.

Referring to the drawing.

Figure 4:
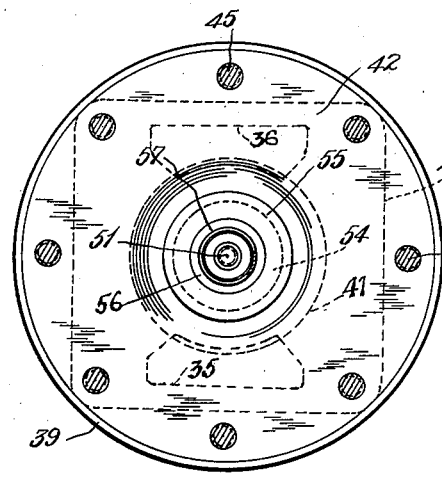
Figure 4 is a transverse sectional view taken on line 4—4 of Figure 1.

In the drawing, I have illustrated a rotary fuel pump provided with a fuel by-pass and relief valve embodying the present invention and designed especially for use on aircraft where lightness, compactness, and efficiency are of utmost importance.

The pump structure will be only briefly described herein, inasmuch as a detailed description is contained in my copending application heretofore referred to, and for a clearer understanding reference may be had thereto.

The fuel pump is indicated generally by the numeral 10 and consists of a housing 11, preferably of aluminum or some similar light-weight material, having an axial opening 12 therein extending inwardly from one end of the housing and which is closed at the other end by an integral end wall 13. The housing 11 is provided with an interiorly screwthreaded opening 14 on one side thereof, which communicates with the axial bore 12, while the opposite side of the housing is provided with a similar screwthreaded opening 15 which likewise communicates with the bore 12, as more clearly shown in Figure 2. These openings 14 and 15 are adapted to be connected, one with the fuel supply and the other with the carbureter which supplies the fuel to the motor, and the respective openings will be connected in the manner herein stated, depending on the direction of rotation of the fuel pump.

A liner 17, preferably of hardened steel, is positioned within the axial bore 12 and is provided with an axial bore 18 which is eccentric to the axial bore 12. The liner 17, as more clearly shown in Figure 2, has oppositely disposed, transversely extending openings 19' and 19 communicating respectively with the screwthreaded openings 14 and 15 so as to provide communication with the interior of the bore 18, the latter constituting a circular chamber.

A rotor 21, preferably of hardened steel, is eccentrically positioned within the bore 18 and has a running engagement with the inner peripheral wall of the chamber at 22, which separates the opening 19' from the opening 19. The rotor 21 is provided with tubular extensions which extend axially thereof, and are suitably mounted for rotation in the housing. The body portion of the rotor 21 is provided with angularly disposed slots, positioned longitudinally, and within which are slidably mounted a plurality of blades 24, the blades being coextensive with the body portion of the rotor. The outer ends of the blades 24 are adapted for engagement with the inner peripheral wall of the chamber, while the inner end of the blades extend inwardly within an axial bore 25 provided in the rotor. A roller member 26 is freely positioned within the bore 25 and is adapted for engagement with the inner ends of the blades 24 to maintain the latter in spaced relation. An axial extension 41' has one end projecting through a cover plate attached to the open end of the housing 11 and its inner end resiliently or flexibly connected to the adjacent end of the rotor 21. By suitably connecting the extension 41 with the motor the rotor is positively driven as desired.

The operating parts of the pump are, of course, so arranged that the pump may be operated in either direction without the necessity of rearrangement thereof, which is quite advantageous in view of the fact that different types of motors operate in different directions. It is not necessary, therefore, to change the position of the pump, irrespective of the direction of rotation of the motor used.

When the pump is used on an airplane, the rotor is operated at various speeds, depending upon the R. P. M. of the motor, as the rotor is usually connected to the motor to operate at the same or slightly greater R. P. M. The volume of fuel pumped by the pump therefore varies with the changes in the R. P. M., and, for example, at 2000 R. P. M. approximately 350 gallons of fuel per hour are pumped by the pump. Such a volume of fuel is, of course, out of proportion to the volume of fuel adapted to be handled by the carbureter, and means must therefore, be provided to return the excess fuel to the inlet side of the pump. Furthermore, for efficient operation of the motor, the fuel should be delivered at a constant pressure irrespective of the volume required, and the pressure most effective has been found to be approximately 3½ pounds, although this may vary somewhat, depending upon different conditions. Means is, therefore, provided in the pump to maintain the volume of fuel discharged at a constant pressure irrespective of flying conditions.

A second hollow housing 27, of aluminum or other similar material, is detachably connected to the housing proper 11 and has two positions of mounting thereon so as to adapt the pump for operation in either direction without the necessity of dismantling the operating elements. This housing is provided with a transversely extending partition 28 having an axial opening providing a valve seat 29 on its outer side. A relief valve member 30 has a valve head 31 engageable with the valve seat 29 and a depending tubular stem portion 32 having its lower end slidably mounted in an opening 33 provided in the adjacent portion of the housing 11, the bottom of the stem terminating short of the bottom of the opening 33 to provide a dash pot for minimizing vibrations imparted to the valve member. The under side of the valve head 31 is in communication with the outlet opening 15 through aligned openings 34 and 35 provided in the respective housings while the outer side of the valve head 31 is in communication with the inlet opening through aligned openings 36 and 37 similarly located.

The upper end of the tubular housing 27 has an outwardly extending circumferential flange 38 which is provided with a marginal extension 39 to provide a recessed outer surface and an inwardly extending circumferential flange 40 of lesser depth providing an axial opening 41 above the valve head. A relatively flat flexible disc 42, of impervious material such as Duprene and fabric or other suitable material, is positioned within the recessed outer surface of the tubular housing and extends across the opening 41. A cover 43 has a circumferential flange 44 fitting snugly within the recessed portion and is detachably connected to the flange 38 by means of a plurality of screws 45 which engage aligned openings provided in the respective flanges and the marginal edge of the disc 42 so as to provide a sealed joint. The cover 43 also has on a conical tapered portion 46 providing a chamber 47 above the central portion of the disc 42 and a tubular extension 48 extending axially outwardly therefrom which is provided with a reduced externally screwthreaded end 49 providing a shoulder 50.

The valve member 30 is connected to the disc 42 by a pin 51 which has a lower end portion 52 projecting through an axial opening in the valve head 31 and into the tubular stem portion where the end is upset or peened over to secure the end portion 52 securely to the valve head. The pin 51 is further provided with an enlarged portion 53 providing shoulders which desirably space the valve head and disc. A washer 54 has a central opening through which the upper end of the pin projects and is disposed upon the under side of the disc 42 in engagement with the upper or adjacent shoulder of the enlarged portion 53. The disc 42 has a central opening to accommodate the upper end of the pin and a second washer 55, of slightly large diameter than the diameter of the washer 54, has a central opening through which the upper end of the pin projects and is disposed upon the upper side of the disc. The upper end of the pin is exteriorly screw-threaded to receive a nut 56 which, when screwed tightly into engagement with the washer 55, secures the washers and disc in assembled relation. It will be noted that the washers are disposed adjacent the opening 41 in concentric relation and that a definite relation is maintained between the adjacent peripheral surfaces for a purpose to be later described.

Figure 3:
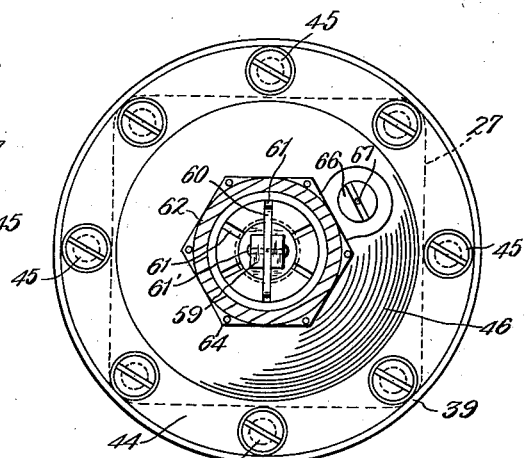
Figure 3 is a top plan view of the pump with a portion thereof in section taken on line 3—3 of Figure 2 so as to more clearly illustrate the spring adjusting means.
Figure 1:
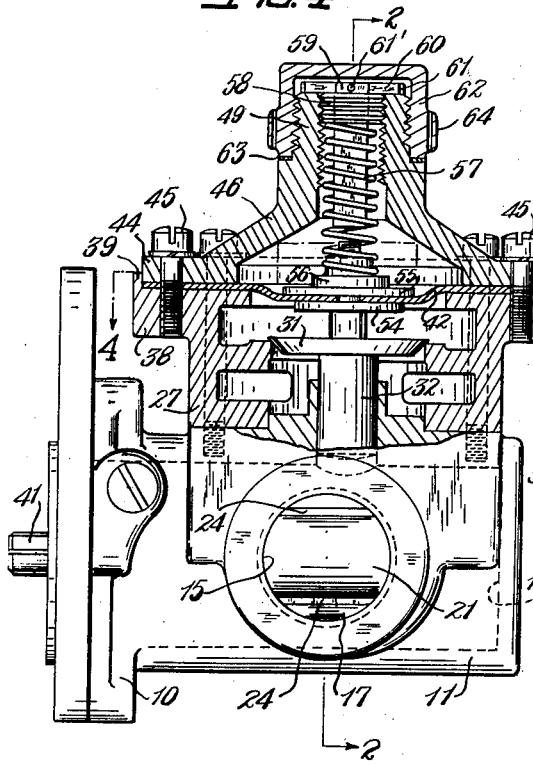
Figure 1 is a side elevational view of a pump and relief valve embodying the present invention.

A coiled spring 57 has its lower end encircling a reduced end of the nut 56 resting upon the latter while its upper portion fits freely within the tubular extension 48. The tubular extension 48 is interiorly screwthreaded inwardly from its outer end to receive an adjusting plug 58 which has its inner end in engagement with the outer end of the spring by means of which the tension of the latter may be varied so as to predeterminately preload the relief valve and to normally maintain the latter in engagement with its valve seat. The plug 58 may be adjusted in any desirable manner but a simple and efficient means includes a square rod 59 slidably mounted in a square opening provided in the plug and disposed centrally within the spring 57 the inner end of the rod 59 being spaced from but engageable with the outer end of the pin 51 so as to limit the outward movement of the relief valve. The outer end of the rod 59 is provided with a transversely extending slot which receives a bar 60 secured to the rod by means of a pin 61' which has its opposite ends upset or peened over so as to provide a secure connection. The bar 60 has its ends projecting beyond the plug 58 and adapted to fit within a pair of transversely aligned slots 61 provided in the outer end of the extension 48 to prevent accidental movement of the plug after once being properly adjusted. A plurality of these pairs of transversely aligned slots are provided so as to obtain a fine adjustment of the spring tension as more clearly shown in Figure 3.

An interiorly screwthreaded cap 62 is mounted on the outer end of the extension and the inner end engages a gasket 63 which rests upon the shoulder 50 so as to provide a sealed joint. The cap 62 is provided with a hexagonal portion 64 to accommodate a wrench or other tool by means of which the cap may be securely tightened or removed. The closed end of the cap 62 also prevents disengagement between the ends of the bar and their cooperating slots when the cap is properly in place.

The conical portion 46 is provided with a pipe tap 65 which is normally closed by a plug 66 having an axial opening 67 therethrough which connects the chamber 47 and consequently the outside of the disc 42 with the atmosphere. When the motor is super-charged the plug 66 is removed and the super-charger is connected by a suitable conduit with the tapped opening 65 thus establishing communication with the chamber 47.

Figure 2:
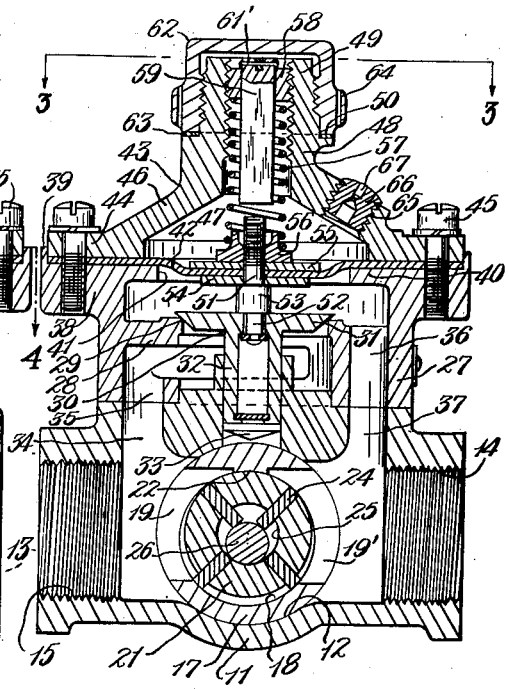
Figure 2 is a transverse sectional view, taken on line 2—2 of Figure 1.

In the operation of the pump with the rotor rotating in a clockwise direction as viewed in Figure 2, fuel is drawn in through the inlet opening 14, passes around the rotor and is discharged from the outlet opening 15 where it passes to the carburetor in desired volume and at the most efficient pressure, the latter two factors being controlled by the preloading of the relief valve. Inasmuch as the capacity of the pump is much greater than the volume of fuel required by the carbureter, the excess fuel passes upwardly through the communicating openings 34 and 35 into engagement with the under side of the valve head 31 and the pressure exerted raises the valve head from its valve seat so as to permit the excess fuel to pass therethrough and return, through the communicating openings 36 and 37, to the inlet opening 14, its return being aided by the suction present at the inlet opening. It will be noted that the washer 55 is of a larger diameter than the washer 54. The washer 54 must be of such size that the effective suction area thereof combined with the effective suction area of said diaphragm substantially equals the effective suction area of said valve head whereby to provide a statically balanced relation. With this arrangement, the pump inlet suction effect upon the diaphragm and washer exactly balances the inlet pump suction effect upon the valve, with the result that the two effects cancel each other. By reason of the opposite side of the disc 42 being in communication with the atmosphere, or the super-charger as the case may be, the valve member is at all times properly balanced and therefore unaffected by changes in pressure occurring at the inlet opening particularly due to changes in flying conditions.

When the pump becomes inoperative for any reason, fuel may be by-passed by means of the wobble pump installed on a plane in a suitable handy location. The operation of this wobble pump draws fuel from the tank and forces it into the inlet opening 14 of the pump shown in Figure 2. The fuel passes upwardly through the communicating openings 37 and 36 and into the chamber between the top side of the valve head and the under side of the disc 42. To overcome the otherwise balanced condition of the valve member, the washer 55 is made larger than the washer 54 so that its effective area combined with the effective area of said diaphragm is greater than the effective area of said valve head whereby pressure exerted by the inflow of fluid into the chamber between the top side of the valve head and the under side of the diaphragm causes the valve head to be lifted from its seat and after the valve is once off, the valve area is of no consequence and fuel is passed through the pump into the carbureter at no great pressure difference between the inlet and outlet openings of the pump.

It will be noted that in the present instance, I have illustrated and described the use of an impervious flexible substantially flat disc or diaphragm which well satisfies the conditions required but it should be understood that other types may be adopted which have the required characteristics.

While I have described the preferred embodiment of the invention it is to be understood that I am not to be limited thereto inasmuch as changes and modifications may be resorted to without departing from the spirit of the invention as defined in the appended claims.

What is claimed is:

1. A relief valve for rotary fuel pumps and the like comprising a housing having a fuel passageway therein, a movable valve member mounted in said housing and operatively associated with said fuel passageway for controlling the flow of fuel therethrough, means for resistably preloading said valve member, a relatively flat flexible diaphragm having its marginal edge in sealed engagement with the adjacent portion of said housing and its central portion extending across said valve member in spaced relation therewith but connected thereto, and means on said diaphragm the effective area of which combined with the effective area of said diaphragm is substantially equal to the effective area of said valve member both of which are subject to the suction created at the inlet opening of the pump whereby the preloading of said valve member is uninfluenced thereby.

2. A relief valve for rotary fuel pumps and the like comprising a housing having a fuel passageway therein, a movable valve member mounted in said housing and operatively associated with said fuel passageway for controlling the flow of fuel therethrough, means for resistably preloading said valve member, a relatively flat flexible diaphragm having its marginal edge in sealed engagement with the adjacent portion of said housing and its central portion extending across said valve member in spaced relation therewith but connected thereto, the opposite side of said diaphragm being in communication with the atmosphere whereby said valve member will be uninfluenced by variation of pressure at the inlet opening due to changes in flying conditions, and means on said diaphragm the effective area of which combined with the effective area of said diaphragm is substantially equal to the effective area of said valve member both of which are subject to the suction created at the inlet opening of the pump whereby the preloading of said valve member is uninfluenced thereby.

3. A relief valve for rotary fuel pumps and the like comprising a housing having a fuel passageway therein, a movable valve member mounted in said housing and operatively associated with said fuel passageway for controlling the flow of fuel therethrough, a spring mounted in said housing and having one end operatively connected with said valve member for normally maintaining the latter in closed position, a plug adjustably mounted in said housing and engageable with the opposite end of said spring for varying the tension of the latter, said plug being provided with an axial opening, a member slidably but non-rotatably mounted in the opening in said plug and having one end disposed adjacent said valve member for limiting its outward movement, a bar secured to the outer end of said member and having its opposite ends projecting transversely beyond said plug, said housing being provided with pairs of transversely aligned recesses, any pair of which is adapted to receive the opposite ends of said bar so as to maintain said plug in adjusted position, means normally preventing disengagement between the ends of said bar and their associated recesses, a relatively flat flexible diaphragm having its marginal edge in sealed engagement with the adjacent portion of said housing and its central portion extending across said valve member in spaced relation therewith but connected thereto, and means on said diaphragm the effective area of which combined with the effective area of said diaphragm is substantially equal to the effective area of said valve member both of which are subject to the suction created at the inlet opening of the pump whereby the preloading of said valve member is uninfluenced thereby.

4. A rotary fuel pump for use on aircraft comprising a housing provided with fuel inlet and outlet openings adapted for connection with the fuel tank and carbureter respectively, rotary pumping means in said housing for delivering fuel from said inlet opening to said outlet opening, said housing being provided with an excess fuel return passageway connecting said outlet opening with said inlet opening, said passageway also functioning as a by-pass for fuel from said inlet opening to said outlet opening in the event that said pumping means becomes inoperative, a movable valve member mounted in said housing and operatively associated with said fuel passageway for controlling the flow of fuel therethrough, means for resistably preloading said valve member, a relatively flat flexible diaphragm having its marginal edge in sealed engagement with the adjacent portion of said housing and its central portion extending across said valve member in spaced relation therewith but connected thereto, and means on said diaphragm the effective area of which combined with the effective area of said diaphragm is substantially equal to the effective area of said valve member when subjected to suction created at the inlet side of the pump whereby the pre-loading of said valve member is uneffected thereby, the effective area of said means combined with the effective area of said diaphragm being relatively greater than the effective area of said valve member when subjected to pressure created by the inflow of by-passed fuel whereby said valve member is removed from its seat to permit the discharge of fuel from the outlet opening without any appreciable difference in the pressure of the introduced fuel.

5. A rotary fuel pump for use on aircraft comprising a housing provided with fuel inlet and outlet openings adapted for connection with the fuel tank and carbureter respectively, rotary pumping means in said housing for delivering fuel from said inlet opening to said outlet opening, said housing being provided with an excess fuel return passageway connecting said outlet opening with said inlet opening, said passageway also functioning as a by-pass for fuel from said inlet opening to said outlet opening in the event that said pumping means becomes inoperative, a movable valve member mounted in said housing and operatively associated with said fuel passageway for controlling the flow of fuel therethrough, means for resistably preloading said valve member, a relatively flat flexible diaphragm having its marginal edge in sealed engagement with the adjacent portion of said housing and its central portion extending across said valve member in spaced relation therewith but connected thereto, means on the opposite sides of said diaphragm having relatively different areas, the effective area of one of said means combined with the effective area of said diaphragm being substantially equal to the effective area of said valve member both of which are subject to the suction created at the inlet side of the pump whereby the pre-loading of said valve member is uninfluenced thereby, the effective area of the other of said means combined with the effective area of said diaphragm being greater than the effective area of said valve member whereby when subjected to pressure resulting from the introduction of by-passed fuel said valve member is removed from its seat to permit the discharge of fuel from the outlet opening without any appreciable difference in the pressure of the introduced fuel.

6. A rotary fuel pump for use on aircraft comprising a housing provided with fuel inlet and outlet openings adapted for connection with the fuel tank and carbureter respectively, rotary pumping means in said housing for delivering fuel from said inlet opening to said outlet opening, said housing being provided with an excess fuel return passageway connecting said outlet opening with said inlet opening, said passageway also functioning as a by-pass for fuel from said inlet opening to said outlet opening in the event that said pumping means becomes inoperative, a movable valve member mounted in said housing and operatively associated with said fuel passageway for controlling the flow of fuel therethrough, means for resistably preloading said valve member, an unbalanced relatively flat flexible diaphragm having its marginal edge in sealed engagement with the adjacent portion of said housing and its central portion extending across said valve member in spaced relation therewith but connected thereto, said diaphragm being balanced with respect to said valve member and thereby uneffected by suction normally created at the inlet opening of said pump whereby the preloading of said valve member is uninfluenced thereby, said diaphragm, however, being unbalanced with respect to said valve member when subjected to pressure resulting from the introduction of by-passed fuel thus unseating said valve member to permit the discharge of fuel from the outlet opening without any appreciable difference in the pressure of the introduced fuel.

7. A rotary fuel pump for use on aircraft comprising a housing provided with fuel inlet and outlet openings adapted for connection with the fuel tank and carbureter respectively, rotary pumping means in said housing for delivering fuel from said inlet opening to said outlet opening, said housing being provided with an excess fuel return passageway connecting said outlet opening with said inlet opening, said passageway also functioning as a by-pass for fuel from said inlet opening to said outlet opening in the event that said pumping means becomes inoperative, a movable valve member mounted in said housing and operatively associated with said fuel passageway for controlling the flow of fuel therethrough, means for resistably preloading said valve member, a relatively flat flexible diaphragm having its marginal edge in sealed engagement with the adjacent portion of said housing and its central portion extending across said valve member in spaced relation therewith but connected thereto, relatively rigid members on the opposite sides of said diaphragm having relatively different areas, the effective area of one of said rigid members combined with the effective area of said diaphragm being substantially equal to the effective area of said valve member both of which are subject to the suction created at the inlet side of the pump whereby the pre-loading of said valve member is uninfluenced thereby, the effective area of the other of said rigid members combined with the effective area of said diaphragm being greater than the effective area of said valve member whereby when subjected to pressure resulting from the introduction of by-passed fuel said valve member is removed from its seat to permit the discharge of fuel from the outlet opening without any appreciable difference in the pressure of the introduced fuel.

8. A rotary fuel pump for use on aircraft comprising a housing provided with fuel inlet and outlet openings adapted for connection with the fuel tank and carbureter respectively, rotary pumping means in said housing for delivering fuel from said inlet opening to said outlet opening, said housing being provided with an excess fuel return passageway connecting said outlet opening with said inlet opening, said passageway also functioning as a by-pass for fuel from said inlet opening to said outlet opening in the event that said pumping means becomes inoperative, a movable valve member mounted in said housing and operatively associated with said fuel passageway for controlling the flow of fuel therethrough, means for resistably preloading said valve member, a relatively flat flexible diaphragm having its marginal edge in sealed engagement with the adjacent portion of said housing and its central portion extending across said valve member in spaced relation therewith but connected thereto, relatively rigid members on the opposite sides of said diaphragm having relatively different areas and having a definite relation with the adjacent portion of said housing at the point of attachment of said diaphragm, the effective area of one of said rigid members combined with the effective area of said diaphragm being substantially equal to the effective area of said valve member both of which are subject to the suction created at the inlet side of the pump whereby the pre-loading of said valve member is uninfluenced thereby, the effective area of the other of said rigid members combined with the effective area of said diaphragm being greater than the effective area of said valve member whereby when subjected to pressure resulting from the introduction of by-passed fuel said valve member is removed from its seat to permit the discharge of fuel from the outlet opening without any appreciable difference in the pressure of the introduced fuel.

9. A relief and by-pass valve for rotary fuel pumps and the like, comprising a housing adapted for connection with a fuel pump and having a fuel passageway therein through which excess fuel may be returned in one direction to the inlet side of the pump or fuel by-passed in the opposite direction to the outlet side of the pump, a movable valve member mounted in said housing and having a valve head operatively associated with said passageway for controlling the flow of fuel therethrough in opposite directions, means for resistably preloading said valve member, a flexible diaphragm having its marginal edge in sealed engagement with the adjacent portion of said housing and its central portion extending across said valve member in spaced relation therewith, relatively rigid members on the opposite sides of said diaphragm having relatively different areas and disposed centrally thereof, and a member connecting said valve head, diaphragm and rigid members in assembled relation for unitary movement, the effective area of one of said rigid members combined with the effective area of said diaphragm being substantially equal to the effective area of said valve head whereby said valve member is uneffected by suction created at the inlet side of the pump and the preloading thereof effectively maintained, the effective area of the other of said rigid members combined with the effective area of said diaphragm being relatively greater than the effective area of said valve head whereby said valve member is moved to open position by the pressure of the introduced by-passed fuel to permit flow thereby and to the discharge side of the pump.

10. A relief and by-pass valve for rotary fuel pumps and the like, comprising a housing adapted for connection with a fuel pump and having a fuel passageway therein through which excess fuel may be returned in one direction to the inlet side of the pump or fuel by-passed in the opposite direction to the outlet side of the pump, a movable valve member mounted in said housing and having a valve head operatively associated with said passageway for controlling the flow of fuel therethrough in opposite directions, means for resistably preloading said valve member, a flexible diaphragm having its marginal edge in sealed engagement with the adjacent portion of said housing and its central portion extending across said valve member in spaced relation therewith, relatively rigid members on the opposite sides of said diaphragm having relatively different areas and disposed centrally thereof, a member connected to said valve and having a portion projecting through aligned openings in said diaphragm and rigid members, the outer end of said member being screwthreaded, and a nut engageable with the screwthreaded end of said member for securing said diaphragm and rigid members in assembled relation for unitary movement with said valve member, the effective area of one of said rigid members combined with the effective area of said diaphragm being substantially equal to the effective area of said valve head whereby said valve member is uneffected by suction created at the inlet side of the pump and the preloading thereof effectively maintained, the effective area of the other of said rigid members combined with the effective area of said diaphragm being relatively greater than the effective area of said valve head whereby said valve member is moved to open position by the pressure of the introduced by-passed fuel to permit flow thereby and to the discharge side of the pump.

11. A relief and by-pass valve for rotary fuel pumps and the like, comprising a housing adapted for connection with a fuel pump and having a fuel passageway therein through which excess fuel may be returned in one direction to the inlet side of the pump or fuel by-passed in the opposite direction to the outlet side of the pump, a movable valve member mounted in said housing and having a valve head operatively associated with said passageway for controlling the flow of fuel therethrough in opposite directions, a flexible diaphragm having its marginal edge in sealed engagement with the adjacent portion of said housing and its central portion extending across said valve member in spaced relation therewith, relatively rigid members on the opposite sides of said diaphragm having relatively different areas and disposed centrally thereof, a member connecting said valve head, diaphragm and rigid members in assembled relation for unitary movement, and resistable means mounted in said housing and having one end in operative engagement with said diaphragm for preloading said valve member, the effective area of one of said rigid members combined with the effective area of said diaphragm being substantially equal to the effective area of said valve head whereby said valve member is uneffected by suction created at the inlet side of the pump and the pre-loading thereof effectively maintained, the effective area of the other of said rigid members combined with the effective area of said diaphragm being relatively greater than the effective area of said valve head whereby said valve member is moved to open position by the pressure of the introduced by-passed fuel to permit flow thereby and to the discharge side of the pump.

12. A relief and by-pass valve for rotary fuel pumps and the like, comprising a housing adapted for connection with a fuel pump and having a fuel passageway therein through which excess fuel may be returned in one direction to the inlet side of the pump or fuel by-passed in the opposite direction to the outlet side of the pump, a movable valve member mounted in said housing and having a valve head operatively associated with said passageway for controlling the flow of fuel therethrough in opposite directions, a flexible diaphragm having its marginal edge in sealed engagement with the adjacent portion of said housing and its central portion extending across said valve member in spaced relation therewith, relatively rigid members on the opposite sides of said diaphragm having relatively different areas and disposed centrally thereof, a member connecting said valve head, diaphragm and rigid members in assembled relation for unitary movement, a coiled spring mounted in said housing and having one end in operative engagement with said diaphragm for maintaining a pressure on said valve member, and means adjustably mounted in said housing and engageable with the opposite end of said spring for varying the tension of the latter, the effective area of one of said rigid members combined with the effective area of said diaphragm being substantially equal to the effective area of said valve head whereby said valve member is uneffected by suction created at the inlet side of the pump and the pre-loading thereof effectively maintained, the effective area of the other of said rigid members combined with the effective area of said diaphragm being relatively greater than the effective area of said valve head whereby said valve member is moved to open position by the pressure of the introduced by-passed fuel to permit flow thereby and to the discharge side of the pump.

13. A relief and by-pass valve for rotary fuel pumps and the like, comprising a housing adapted for connection with a fuel pump and having a fuel passageway therein, a movable valve member mounted in said housing and operatively associated with said passageway for controlling the flow of fuel therethrough, a flexible diaphragm having its marginal edge in sealed engagement with the adjacent portion of said housing and its central portion extending across said valve member in spaced relation therewith, relatively rigid members on the opposite sides of said diaphragm having relatively different areas and disposed centrally thereof, a member connecting said valve member, diaphragm and rigid members in assembled relation for unitary movement, a coiled spring mounted in said housing and having one end in operative engagement with said diaphragm for maintaining a pressure on said valve member, a plug adjustably mounted in said housing and engageable with the opposite end of said spring for varying the tension of the latter, said plug being provided with a non-circular opening therethrough, a non-circular member slidably mounted in the opening in said plug and having a lateral extension at its outer end, the inner end of said member being disposed adjacent said diaphragm in spaced relation thereto to limit the opening movement of said valve member, said housing being provided with recesses to receive the lateral extension of said non-circular member to maintain said plug in adjusted position, and means normally preventing disengagement between said lateral extension and its associated recess.

14. In an aircraft fuel pump and relief valve assembly effective to deliver a constant outlet pressure irrespective of the varying speed of the pump, said assembly comprising a housing having fuel inlet and outlet openings, means in said housing for pumping fuel from said inlet to said outlet, means defining a relief passage leading from said outlet to said inlet, a valve seat positioned in said passage facing generally away from said outlet, a valve arranged to be received on said seat for controlling the flow of fluid through said relief passage, the underside of said valve being in communication with said outlet and the opposite side of said valve being in communication with said inlet, said arrangement being particularly characterized by the provision of means for balancing said inlet suction effect on said valve irrespective of the varying values thereof due to the varying speed of said pump, said means comprising a flexible disc diaphragm sealing member connecting the upper side of said valve to the adjacent housing, said diaphragm being in communication on the side thereof adjacent said valve with said inlet and on the other side thereof with the atmosphere, resilient means urging said valve in the closing direction with a predetermined force, the effective suction area of said balancing means responsive to inlet suction tending to close the valve being equal to the effective suction area of said valve tending to open the same, whereby widely varying inlet suctions do not affect the operation of said valve.

JAMES P. JOHNSON.